July 31, 1956 H. G. ANDRÉ 2,757,222
ELECTRIC STORAGE BATTERIES
Filed Feb. 17, 1954

INVENTOR:
HENRI G. ANDRÉ
BY
Karl F. Ross
AGENT

United States Patent Office 2,757,222
Patented July 31, 1956

2,757,222

ELECTRIC STORAGE BATTERIES

Henri Georges André, Montmorency, France, assignor to Yardney International Corp., New York, N. Y., a corporation of New York Application February 17, 1954, Serial No. 410,944

Claims priority, application France February 23, 1953

4 Claims. (Cl. 136—6)

The invention has for its object to provide an improvement in electric storage batteries, particularly those wherein the electro-chemically active medium is present under pressure, as in batteries of the silver-zinc type.

The invention is particularly applicable to batteries comprising juxtaposed flat elements shaped as flat rectangular cakes or the like. Satisfactory operation of such storage batteries requires that a certain degree of pressure be present between the electrochemically active substances and the separator elements or diaphragms made of semi-permeable material interposed therebetween, so that where a comparatively large number of such elements are juxtaposed the pressure forces exerted upon the end faces may be high. Various means have been suggested for successfully withstanding such pressure forces. The present invention provides means adapted to contain such electric accumulator elements under especially desirable conditions.

It is an object of the invention to provide such means which will be easy to construct, inexpensive, small in size, light in weight and strong.

A specific object of the invention is to provide such means wherein the container proper may have a wall thickness not greater than that of a container for a storage battery wherein the electrochemically active substances are not under pressure.

According to the invention, the set of elements is enclosed in a metal liner which has one of its faces which are subjected to pressure reinforced with pressure-resistant members, e. g. made of plastic material, appropriately ribbed in order to exhibit substantial rigidity, the assembly being adapted to be bodily inserted, together with the elements, into a container of plastic material of conventional type.

The invention will be clearly understood from the ensuing description relating to one exemplary embodiment thereof. Reference is made to the accompanying drawing wherein.

Figure 3:
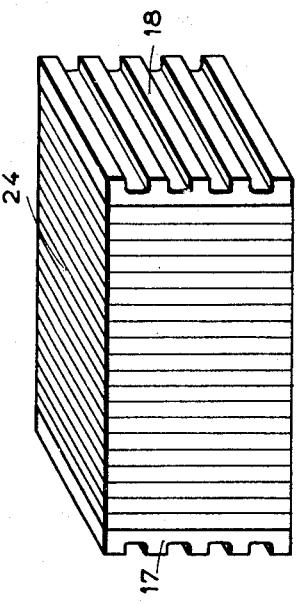
Fig. 3 is a diagrammatic perspective view of electrical elements disposed between the pressure members.
Figure 4:
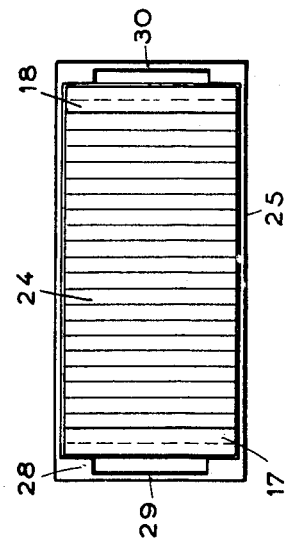
Fig. 4 is a diagrammatic plan view of an electric storage battery.
Figure 1:
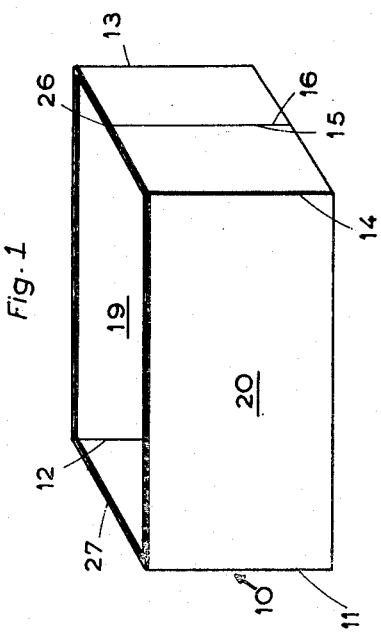
Fig. 1 is a perspective view of a liner.
Figure 2:
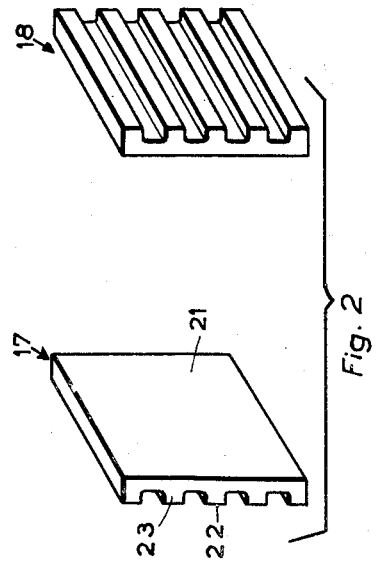
Fig. 2 is a perspective view of two pressure members.

The device comprises a liner element 10 consisting of a strip of thin gauge metal sheeting, e. g. copper sheet, bent angularly at 11, 12, 13 and 14 so as to provide a rectangular box having neither bottom nor top, and with the ends 15 and 16 of the strip suitably bonded to each other. Further provided are spacer or pressure members, 17 and 18 respectively, of generally rectangular form, substantially equal in height to the height of the liner 10, and equal in width to the spacing between those opposite side faces 19 and 20 of the liner which are not subjected to pressure forces. The said members have one flat face 21 directed inwardly of the liner strip and an outer face 22 formed with stiffener ribs 23.

The positive and negative electrode elements 24 shaped as flat cakes are disposed in the liner 10 between the parts 17 and 18, with their larger faces parallel to the faces 21 of said members. Diaphragms of regenerated cellulose are disposed between the electrodes of opposite polarity. The container 25 is made of plastic material and is of a thickness comparable to that of conventional containers. The assembly comprising the liner 10, containing the accumulator elements 24 as well as the spacer members 17 and 18 therein, is inserted in the container. The electrolyte present in the tank exerts a swelling action on the diaphragm separating the accumulator elements and pressure forces are built up which result in forces being exerted on the end faces 26 and 27 of the liner. The said liner however remains undistorted and does not substantially transmit any stress to the container structure 25, proper owing to the action of members 17 and 18 which balance such forces against the tensile strength of the liner faces 19 and 20.

The container 25 is advantageously formed in its corners with shoulders 28 against which the marginal portions of the faces 22 are supported, so that even in the event of slight distortion of the members 17 and 18 the end walls 29 and 30 of the container are not subjected to stress and the container runs no danger of being distorted or broken.

The batteries or accumulators herein referred to may be of the type disclosed in my Patents No. 2,594,709, 2,594,710 and 2,594,711.

What I claim is:

1. In an electric battery, in combination, a rectangular casing having flat end and side walls, said end walls having shoulders formed thereon, a rectangular liner disposed in said casing and having corners thereof abutting said shoulders, a pair of rigid rectangular pressure plates, one of said plates abutting each end of said liner, and an assembly of electrode elements disposed between said plates, said assembly consisting of a plurality of rectangular electrode plates with diaphragms swellable in an electrolyte disposed between said electrode plates.

2. In a battery, the combination according to claim 1, wherein said pressure plates include stiffener ribs on faces abutting said liner, said ribs extending transversely with respect to said shoulders.

3. In an electric battery, in combination, a rectangular liner having an open top and bottom and flat rectangular side and end walls, a pair of rigid rectangular pressure plates abutting opposite end walls of said liner, said plates having ribbed faces adjacent said end walls, and an assembly of rectangular electrode elements disposed between and facing flat sides of said plates, said assembly comprising a plurality of electrically positive and negative electrodes with diaphragms swellable in an electrolyte disposed between said electrodes, said end walls, plates and electrodes having substantially equal heights and widths.

4. In an electric battery, in combination, a casing having end walls and side walls, an electrode assembly in said casing subject to expansive stresses in a direction perpendicular to said end walls, means for preventing substantial deformation of said casing by said stresses, said means including a substantially inelastic liner forming a closed rectangular band about said assembly within said casing, a pair of rigid reinforcement plates having ribbed faces inserted between said liner and said assembly adjacent respective ones of said end walls, said casing having spaced internal shoulders with said liner resting against said shoulders, and with the ribs of said rigid plates extending transversely to said shoulders.

References Cited in the file of this patent

UNITED STATES PATENTS

| | | |
|---|---|---|
| 443,457 | Kitsee | Dec. 23, 1890 |
| 853,877 | Harvey | May 14, 1907 |
| 1,381,608 | Wittmann | June 14, 1921 |
| 2,594,712 | Andre | Apr. 29, 1952 |